United States Patent
Budd et al.

(10) Patent No.: US 6,458,512 B1
(45) Date of Patent: Oct. 1, 2002

(54) OXYNITRIDE ENCAPSULATED ELECTROLUMINESCENT PHOSPHOR PARTICLES

(75) Inventors: Kenton D. Budd; Moses M. David, both of Woodbury; Stephen L. Lieder, Wyoming; Kyung H. Moh, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/170,676

(22) Filed: Oct. 13, 1998

(51) Int. Cl.[7] .............................. B52B 15/00; H01J 1/70; H01J 1/63; B32B 5/16
(52) U.S. Cl. ..................... 430/311; 428/403; 428/404; 428/690; 428/917; 253/301.4 R; 253/301.6 R; 253/301.6 S; 253/301.6 P; 253/301.4 S; 313/512; 313/503; 257/100; 427/66
(58) Field of Search ................. 428/690, 403, 428/404, 917; 253/301.4 R, 301.6 R, 301.6 S, 301.6 P, 301.4 S; 313/512, 503; 257/100; 430/311; 427/66

(56) References Cited

U.S. PATENT DOCUMENTS

| | | | |
|---|---|---|---|
| 4,532,022 A | | 7/1985 | Takasaki et al. ............ 204/192 |
| 4,985,313 A | | 1/1991 | Penneck et al. ............ 428/627 |
| 5,080,928 A | | 1/1992 | Klinedinst et al. ............ 427/70 |
| 5,126,166 A | * | 6/1992 | Dutta et al. .................. 427/67 |
| 5,156,885 A | | 10/1992 | Budd ......................... 427/70 |
| 5,213,591 A | * | 5/1993 | Celikkaya et al. ............ 51/293 |
| 5,234,869 A | | 8/1993 | Mikata et al. .............. 437/241 |
| 5,306,385 A | | 4/1994 | Cho et al. .................. 156/610 |
| 5,461,545 A | * | 10/1995 | Leroy et al. ............... 361/765 |
| 5,500,279 A | * | 3/1996 | Walter et al. ............... 428/213 |
| 5,856,009 A | | 1/1999 | Nishio et al. ............... 428/404 |
| 5,958,591 A | * | 9/1999 | Budd ......................... 428/403 |
| 6,064,150 A | | 5/2000 | Klinedinst et al. .......... 313/503 |
| 6,193,908 B1 | * | 2/2001 | Hampden-Smith et al. ...... 252/301.4 R |

FOREIGN PATENT DOCUMENTS

| | | |
|---|---|---|
| EP | 0 928 826 | 7/1999 |
| JP | 8-176540 | 4/1996 |
| JP | 9-104863 | 7/1997 |
| WO | WO 99/00463 | 1/1999 |

OTHER PUBLICATIONS

"Low–Temperature Plasma Coating of Electroluminescence Particles With Silicon Nitride Film" from Journal of Materials Science 28 (1993), pp. 1829–1833.

J. Nakamura and T. Hirate, Report cMP87–31, Institute of Electronics, Information and Communication Engineers, Japan (1987).

"Low–Temperature Plasma Coating of Electroluminescence Particles With Silicon Nitride Film" from Journal of Materials Science 28 (1993), pp. 1829–1833.

J. Nakamura and T. Hirate, Report CPM87–31, Institute of Electronics, Information and Communication Engineers, Japan (1987).

\* cited by examiner

Primary Examiner—John S. Chu
Assistant Examiner—Sin J. Lee
(74) Attorney, Agent, or Firm—Brian E. Szymanski; Harold C. Knecht, III

(57) ABSTRACT

Encapsulated electroluminescent phosphor particles and a method of making same. Each electroluminescent phosphor particle is encapsulated by a substantially transparent metal oxynitride coating. The coating provides the phosphor particle with reduced sensitivity to humidity accelerated decay.

32 Claims, No Drawings

OXYNITRIDE ENCAPSULATED ELECTROLUMINESCENT PHOSPHOR PARTICLES

FIELD OF THE INVENTION

The present invention relates to electroluminescent phosphor particles, particularly, to phosphor particles which are encapsulated in a moisture resistant coating and exhibit high electroluminescent brightness and, even more particularly to such an electroluminescent phosphor particle encapsulated with a metal oxynitride protective coating having improved electrical, chemical, thermal-mechanical, or surface characteristics. The present invention also relates to a method for making such encapsulated phosphor particles.

BACKGROUND

Phosphor particles are used in a variety of applications such as flat panel displays and decorations, cathode ray tubes, and fluorescent lighting fixtures. Luminescence or light emission by phosphor particles may be stimulated by application of various forms of energy including electric fields (electroluminescence). Electroluminescent ("EL") phosphors have significant commercial importance. The luminescent brightness of such phosphors and the "maintenance" of this, brightness are two criteria typically used to characterize phosphor particles.

Luminescent brightness is typically reported as a quantity of light emitted by the subject phosphor when excited. Because of the sensitivity of phosphor emission brightness to varying conditions of excitement, it is often useful to report the brightness of phosphors as relative brightness rather than as absolute brightness. "Maintenance" refers to the rate at which phosphors lose brightness (i.e., decay) with operating time. The rate of decay is substantially increased if the phosphor particles are subjected to conditions of high humidity while being operated. This effect of moisture or high humidity has been referred to as "humidity-accelerated decay".

Particulate EL phosphors are most commonly used in thick film constructions. These devices typically include a layer of an organic material. having a high dielectric constant which forms a matrix for a load of phosphor particles. Such layers are typically coated on a plastic substrate having a transparent front electrode. A rear electrode is typically applied to the backside of the phosphor layer, with a dielectric layer sandwiched there between. When an electric field is applied across the electrodes, the proximate portions of the layer emit light as the phosphor particles therein are excited.

Organic matrices and substrate materials, as well as organic coatings applied to individual particles, have typically been ineffective in preventing the decay of brightness caused by the diffusion of water vapor to the phosphor particles. For this reason, thick film electroluminescent devices have been encased in relatively thick envelopes, e.g., 25 to 125 microns, of moisture-resistant polymeric materials. However, such envelopes are typically expensive, result in unlit borders, and have the potential of delaminating, for example, under heat.

To improve their moisture resistance, phosphor particles have been encapsulated in an inorganic coating, such as a coating of a metal oxide. Inorganic coating techniques have been employed with varying degrees of success. Hydrolysis-based processes for encapsulating EL phosphor particles in an inorganic coating, e.g., hydrolysis-based chemical vapor deposition (CVD), have typically been the most successful. In hydrolysis-based CVD processes, water and oxide precursors are used to form the protective coating. Such hydrolysis-based CVD processes have been able to produce moisture insensitive encapsulated phosphor particles, while minimizing process related phosphor damage and retaining a high initial luminescent brightness.

Thus, existing coatings on phosphors provide protection against humidity accelerated decay, but there is a continuing need for new coating materials which provide protection from moisture, and which provide improved electrical, chemical, thermal-mechanical, or surface characteristics.

SUMMARY OF THE INVENTION

The present invention provides novel encapsulated phosphor particles, each having a substantially transparent metal oxynitride coating. The encapsulated phosphors exhibit a reduced sensitivity to humidity-accelerated decay of luminescent brightness. Additionally, the present invention involves a method which results in the encapsulated particles.

Each encapsulated particle of the present invention includes a phosphor particle of an electroluminescent phosphor material which exhibits humidity-accelerated decay in the presence of moisture. The phosphor particle is coated with a substantially transparent metal oxynitride. The metal oxynitride sufficiently encapsulates the phosphor particle to provide the particle with reduced sensitivity to humidity-accelerated decay.

The phosphor particles are generally made of at least one of a zinc sulfide-based phosphor, a calcium sulfide-based phosphor, a zinc selenide-based phosphor, a strontium sulfide-based phosphor or a combination of the phosphor compounds. The phosphor particles are sensitive to humidity-accelerated decay and to thermal degradation if exposed to high; temperatures.

In accordance with the present invention, a metal oxynitride coating sufficiently encapsulates the phosphor particle to limit exposure of the phosphor to moisture or water. The metal oxynitride coating includes one or more layers of a single metal oxynitride, a mixed metal oxynitride, or a combination of such layers. The one or more layers are generally applied such that the total thickness of the metal oxynitride coating is in the range of about 0.03 microns to about 1.0 microns. The metal component in the metal oxynitride is preferably selected from aluminum, boron, silicon, titanium, zirconium, or a combination of the preferred metals. Preferably, the oxynitride coating of the present invention has a nitrogen to oxygen molar ratio in the range of about 4:1 to about 1:4.

The metal oxynitride coating of the present invention exhibits reduced sensitivity to chemical degradation caused by exposure to condensed moisture or otherwise liquid water (i.e., greater resistance to corrosion in a liquid water environment). It is desirable for the present metal oxynitride coating to be sufficiently non-porous. The non-porous coating provides a phosphor particle that exhibits reduced sensitivity to humidity. Preferably, the coating is sufficiently non-porous and is also sufficiently resistant to chemical degradation (i.e., corrosion) from water such that the encapsulated particle can survive immersion in a 0.1 molar silver nitrate aqueous solution, with substantial resistance to darkening. Such a silver nitrate test has typically been used to check the permeability of a phosphor coating. Being more resistant to water induced corrosion enables the present metal oxynitride coating to survive for longer periods in a liquid water environment. Additionally, the encapsulated particle of the present invention preferably has an initial electroluminescent brightness of about 50% or greater of the initial electroluminescent brightness of the phosphor particle with no coating.

The present invention also provides a novel method for making such encapsulated phosphor particles. The method comprises providing a bed of phosphor particles, each of which exhibits humidity-accelerated decay in the presence of moisture; providing one or more precursors comprising a vapor phase metal containing precursor, a vapor phase nitrogen containing precursor, and a vapor phase oxygen containing precursor; and exposing the bed to the precursors such that the precursors chemically react and encapsulate each phosphor particle with a metal oxynitride coating. The one or more precursors utilized in the present invention could include compounds in which the metal component and the nitrogen component are present in a single precursor. Additionally, a single precursor containing the metal component, nitrogen and oxygen could be utilized to form the metal oxynitride coating of the present invention. The resulting coating is substantially transparent and sufficiently encapsulating to provide the phosphor particle with reduced sensitivity to humidity-accelerated decay.

DETAILED DESCRIPTION

In accordance with the present invention, it has been discovered that a metal oxynitride coating may be applied onto a phosphor particle to protect the particle from humidity-accelerated decay.

The particles utilized in the present invention are generally phosphor particles which exhibit luminescence or light emission upon stimulation by an electrical field. An electroluminescent phosphor particle of the present invention can comprise, for example, a zinc sulfide-based phosphor, a calcium sulfide-based phosphor, a zinc selenide-based phosphor, strontium sulfide-based phosphor or combinations thereof. Phosphors used in the present invention may be formulated in accordance with conventional practices. For example, zinc sulfide based phosphors are well-known and commonly include one or more of such compounds as copper sulfide, zinc selenide, and cadmium sulfide in solid solution within the zinc sulfide crystal structure or as second phases or domains within the particle structure. Phosphor particles used herein may be of many sizes, typically depending to a large extent on the desired application. Each phosphor particle utilized in the present invention demonstrates the undesirable characteristic of accelerated decay when exposed to moisture or water.

A metal oxynitride coating is utilized to protect the phosphor particles from humidity-accelerated decay. As used herein, a metal oxynitride coating refers to a material made up primarily of at least one metal, nitrogen and oxygen. For purposes of the invention, the coating is defined as one or more layers of a single metal oxynitride, a mixed metal oxynitride, or a combination of such layers. The coating is substantially transparent to permit the passing of light emitted from the phosphor. Additionally, the coating is sufficiently non-porous to adequately encapsulate the phosphor particle and reduce its sensitivity to humidity-accelerated decay. The one or more layers are generally applied such that the total thickness of the metal oxynitride coating is in the range of about 0.03 microns to about 1.0 microns. Coatings which are too thick may tend to be less transparent and result in reduced brightness.

The metal component of the oxynitride coating is preferably selected from the group consisting of aluminum, boron, silicon, titanium, and zirconium or combinations thereof. The molar ratio of components in the oxynitride coating indicates that nitrogen is included in the coating at levels exceeding trace amounts and thus sufficient to enhance or improve the electrical, chemical, thermal-mechanical, or surface characteristics of the coating over an essentially nitrogen-free metal oxide coating. The oxygen content of the coating exceeds trace levels that may be present in pure nitride coatings. In general, the oxygen component of the oxynitride coating provides transparent properties to enable the transmission of visible light and to improve the desired physical properties. The transparency of the metal oxynitride coating is sufficient to enable a useful level of visible light from the phosphor to pass through the coating. The nitrogen to oxygen molar ratio of the oxynitride coating is preferably in the range of about 4:1 to about 1:4, most preferably about 3 or 2:1 to about 1:2 or 3, and even more preferably near about 1:1. The molar ratio of the metal component in the metal oxynitride coating may vary significantly due to the valence of the particular metal used in the coating. The oxynitride may also contain amounts of other elements and compounds, including those originating in the precursor materials or phosphor particles, which can be generated in coating form on phosphor particles under conditions that are at least similar to that described herein.

The method of the present invention comprises: providing a bed of phosphor particles, each of which exhibits humidity-accelerated decay in the presence of moisture; providing one or more precursors comprising a vapor phase metal containing precursor, a vapor phase nitrogen containing precursor; and a vapor phase oxygen containing precursor; exposing the bed to the precursors such that the precursors chemically react and encapsulate the phosphor particles with a metal oxynitride coating. The one or more precursors include any suitable precursor capable of forming the desired metal oxynitride for the coating. The resulting coating is substantially transparent, resistant to chemical degradation from moisture and water, and sufficiently encapsulating to provide the phosphor particle with reduced sensitivity to humidity-accelerated decay.

The method of the present invention is generally practiced through the use of conventional chemical vapor deposition (CVD) techniques. For example, the metal oxynitride coating could be applied onto the phosphor particles utilizing atmospheric pressure CVD or plasma enhanced CVD.

Alternatively, other conventional coating practices, such as sputtering, may be used in applying the metal oxynitride coating. The coating process includes exposing the bed of phosphor particles to the precursor gas mixture so as to coat each phosphor particle by a vapor phase reaction of the one or more precursors including a vapor phase metal containing precursor, a nitrogen containing precursor, and an oxygen containing precursor. The reaction occurs at a temperature under conditions which at least substantially minimize thermal-chemical related damage to the phosphor particles being encapsulated.

In practicing the method of the present invention, uncoated phosphor particles are placed in a reactor and heated to the appropriate temperature. In order to form coatings which sufficiently encapsulate the phosphor particles, the particles are preferably agitated while in the reaction chamber. Illustrative examples of useful methods for agitating the phosphor particles include shaking, vibrating, or rotating the reactor, stirring the particles, or suspending them in a fluidized bed. In such reaction chambers, the particles may be agitated by many different ways such that essentially the entire surface of each particle is exposed and the particles and reaction precursors may be well intermixed. Typically, a preferred reaction chamber is a fluidized bed reactor. Fluidizing typically tends to effectively prevent agglomeration of the particles, achieve uniform mixing of the particles and reaction precursor materials, and provide more uniform reaction conditions, thereby resulting in highly uniform encapsulation characteristics.

Although not required in many instances, when using phosphor particles which tend to agglomerate, it may be desired to add fluidizing aids, e.g., small amounts of fumed silica. Selection of such aids and of useful amounts thereof may be readily determined by those with ordinary skill in the art.

The desired precursor materials in vapor phase are then added to the reactor wherein a vapor phase reaction occurs to form a coating of a metal oxynitride on the surfaces of the phosphor particles. The vapor phase metal containing precursor is generally a metal compound that is capable of reacting with other precursor gas streams to provide the metal component of the metal oxynitride coating. Metal chlorides, for example, are typically utilized in CVD process as a source of metal. Additionally, organic metal sources may be utilized in producing the coating of the present invention. For example, alkyl silanes may be used to provide a source for silicon for the metal oxynitride coating. Examples of other volatile metal containing precursors compounds include metal alkyls, metal alkoxides, metal carbonyls, and metal diketonates. More than one metal precursor may also be used in order to form the mixed metal oxynitride coatings of the present invention.

The nitrogen containing precursor of the present invention is generally any nitrogen compound that is capable of reacting with the other vapor phase precursor streams to form the desired coating. Preferably, ammonia is utilized as the nitrogen containing precursor when separate metal containing and oxygen containing precursors are utilized. The oxygen containing precursor is generally oxygen or water. However, other conventional sources of oxygen suitable for CVD applications may be used in accordance with the present invention.

Alternatively, the metal source and nitrogen source may be provided in at least a single compound. The use of compounds having a metal-nitrogen bond enable lower temperature CVD reactions without the use of plasma, thus reducing thermal-chemical degradation of the phosphor particles. An example of compounds having a metal-nitrogen bond are methyl amino complexes (for example, tetrakis dimethyl amino titanium) of the preferred metals of aluminum, boron, silicon, titanium, or zirconium. These compounds may be utilized as the both the source of the metal and nitrogen, or may be used in conjunction with other metal containing precursors or nitrogen containing precursors to form the metal oxynitride coating.

The metal oxynitride coating of the present invention may also be produced through the use of a single source precursor which includes a metal, nitrogen, and oxygen. For example, a vapor phase precursor containing a metal, alkyl amino ligands, and oxygen containing ligands, such as alkoxy or carboxylate groups, could be used in the inventive process.

The precursor streams are directed to the reaction chamber in the vapor phase. One technique for getting the precursor materials into vapor phase and adding them to the reaction chamber is to bubble a stream of gas, preferably inert, referred to herein as a carrier gas, through a neat liquid of the precursor material and then into the reaction chamber. Illustrative examples of inert gases which may be used herein include argon and nitrogen. Oxygen and/or air may also be used, provided the desired N/O ratio can still be maintained. However, the introduction of excessive amounts of oxygen into the reactor can prevent the formation of the desired oxynitride coating with the requisite nitrogen content. Additionally, it may be necessary to rely on back diffusion, with an open reactor, or to rely on a nitrogen purge to obtain the desired oxynitride coating. An advantage of utilizing a carrier gas is that the carrier gas/precursor streams may be used to fluidize the phosphor particles in the reaction chamber, thereby facilitating the desired encapsulation process. In addition, such a technique provides means for readily controlling the rate of introduction of the precursor materials into the reactor.

The precursor gas streams are exposed to the phosphor compounds where they react and form the metal oxynitride coating of the present invention. When forming the coating, all of the streams are transported into the reactor at the same time. When forming a layered metal oxynitride coating, precursor streams for the initial layer are first transported into the reactor until the particles are encapsulated. Subsequent layers are then formed by directing additional precursor streams onto the encapsulated particles. It may be desirable for the outer layer to comprise a metal oxide coating over the metal oxynitride coating.

Precursor flow rates are adjusted to provide an adequate deposition rate and to provide a metal oxynitride coating of desired quality and character. Flow rates are adjusted such that the ratios of precursor materials present in the reactor chamber promote oxynitride deposition at the surface of the phosphor particles.

Optimum flow rates for a particular application typically depend in part upon the temperature within the reaction chamber, the temperature of the precursor streams, the degree of particle agitation within the reaction chamber, and the particular precursors being used. Those skilled in the art are capable of establishing useful flow rates through experimentation. It is desirable for the flow rate of the carrier gas used to transport the precursor materials to the reaction chamber to be sufficient to agitate the phosphor particles as desired and also transport optimal quantities of precursor materials to the chamber.

It is also desirable for the precursor materials to have sufficiently high vapor pressures so that large enough quantities of precursor material will be transported into the reactor for the coating process to proceed at a conveniently fast rate. For instance, precursor materials having higher vapor pressures will typically provide faster deposition rates than will precursor materials having lower vapor pressures, thereby enabling the use of shorter encapsulation times. Precursor sources may be heated to increase the vapor pressure of the material. In order to prevent condensation between the heated source and the reactor, it may be necessary to heat the tubing or other means used to transport the precursor material to the reactor. In many instances, like, those found tabulated below, the precursor materials will be in the form of neat liquids at room temperature. In some instances, the precursor materials may be available as solids which can be made to sublime.

The precursor materials that are the most desirable are those that are capable of forming the present coatings at temperatures that are low enough not to cause substantial damage to the phosphor particles. It is desirable for the temperature of the reactor to be maintained at temperatures which help insure that the coatings being deposited are sufficiently encapsulating to provide desired protection against humidity-accelerated decay, and are resistant to corrosion from liquid water, while avoiding intrinsic thermal damage or adverse thermal-chemical reactions at the surfaces of the particles which cause undesirable loss of initial brightness. Temperatures required to form oxynitride compounds in CVD reactions tend to be higher than certain reactions to form oxides. However, conditions tend to be less strongly oxidizing and reactive precursors, or precursors containing metal-nitrogen bonds, can be employed as exemplified herein, so as to reduce or minimize thermal-chemical damage to the phosphor particles. Encapsulation processes which are performed at temperatures which are too low may tend to result in coatings which do not provide the desired resistance to humidity-accelerated decay. Such coatings are not sufficiently moisture impermeable because, it is believed, of having a more open structure or a structure which contains excess trapped or unreacted precursor components. Encapsulation processes which are performed at temperatures which are too high may result, for example, in decreased electroluminescent brightness, undesirable changes or shifts in the color of the light emitted by the subject phosphor, or degradation of the intrinsic decay characteristics of the subject phosphor material.

The encapsulated phosphor particles of the present invention provide both reduced sensitivity to humidity and improved electrical, chemical, thermal-mechanical, or surface characteristics. The resulting coatings of the present invention are sufficiently non-porous to provide a phosphor particle with a substantial resistance to darkening when the encapsulated particle is exposed to silver nitrate. Additionally, the encapsulated phosphor particles retain an acceptable level of their initial luminescent brightness. Preferably, each of the encapsulated particles has an initial electroluminescent brightness which is equal to or greater than about 50 percent of the initial electroluminescent brightness of the phosphor particle. Most preferably, the initial electroluminescent brightness of the encapsulated particle is equal to or greater than about 80 percent of the initial electroluminescent brightness of the phosphor particle.

The following non-limiting Examples further illustrate the present invention. Unless otherwise indicated, the following test procedures were used in the Examples. The particular materials and amounts recited in these Examples, as well as other conditions and details, are to be interpreted broadly in the art and should not be construed to unduly restrict or limit the invention in any way.

EXAMPLES

Encapsulation Process

The coating process utilized in preparing the Examples of the present invention was a conventional encapsulation process, similar to that disclosed in U.S. Pat. No. 5,156,885, which is incorporated herein by reference in its entirety. 40 millimeter diameter fluidized bed reactors were used (150 g samples), or 20 mm reactors (smaller samples) each consisting of a glass-frit type funnel with a single bottom inlet and containing suitably sized frit (e.g., size C or D) at the bottom of the reactor bed (i.e., base frit) and the phosphor particles on top of the base frit. Each reactor was modified so as to be heated to a desired temperature in a controlled manner (e.g., by oil bath immersion or wire tape heating). A separate gas inlet tube was used to introduce each of the precursor vapors into each reactor. Instead of using a glass frit, the tip of each inlet tube was tapered so as to disperse the precursor vapors. That is, the taper was such that precursor vapors bubbled out of the inlet tubes and into the phosphor particles sitting above the base frit.

For each reactor, the gas inlet tubes for the precursors were inserted into the fluidized bed, extending through the phosphor particles, so as to introduce the precursor vapor streams (i.e., the carrier gas and precursor vapors) into the reactor just above the base frit near or at the bottom of the phosphor particles (i.e., the reaction zone). As an alternative, these inlet tubes could have been disposed through a side of the reactor.

Suitably sized bubblers were used for each of the precursors. The size of each bubbler and how much each inlet tube is tapered depends, at least in part, on the volatility of the precursor material and the flow rate through the bubblers needed to produce the desired flow rate through the reactor. The bubblers were each kept at about room temperature except as noted. Nitrogen was used as the carrier gas.

Testing Procedures

Brightness Tests The initial ($B_o$) and retained electroluminescent brightness of the Examples were determined using an oil cell and an oil grid saturated air test, respectively, like those disclosed in the previously incorporated U.S. Pat. No. 5,156,885. The resulting data is reported as a percent of initial brightness of the uncoated phosphor or the encapsulated particle, respectively for initial and retained brightness.

TABLE 1

| Example # | Phosphor (grams) | AlCl$_3$ (sccm) | NH$_3$ (sccm) | air (sccm) | temp (° C.) | time (hrs) | B$_0$ (%) | N/O |
|---|---|---|---|---|---|---|---|---|
| 1 | 150 | 500 | 500 | 0 | 350 | 10 | | |
| 2 | 150 | 500 | 500 | 0 | 350 | 10 | | |
| 3 | 150 | 500 | 500 | 0 | 500 | 10 | 38 | 4:1 |
| 4 | 150 | 500 | 500 | 10 | 500 | 10 | 67 | |
| 5 | 150 | 500 | 500 | 50 | 500 | 10 | 15 | |
| 6 | 150 | 700 | 400 | 40 | 550 | 2.5 | 38 | 2:3 |

Silver Nitrate Test The encapsulated particles are immersed in a 0.1 molar silver nitrate solution to test the porosity of the metal oxynitride coating. The uncoated phosphor particles will turn dark or black when exposed to silver nitrate. Encapsulated particles which turn light colors indicate an acceptable result.

N/O ratio was estimated from scanning Auger electron spectroscopy analysis, for which a depth profile was obtained by sputtering through the coatings.

Phosphor Specifications

Commercially available Sylvania type 729 phosphor particles were used in the Examples. The type 729 phosphor is a zinc sulfide-based phosphor.

Examples 1–6
Aluminum Oxy-Nitride Coatings

The phosphor particles were encapsulated with an aluminum oxynitride coating in the encapsulation, process previously disclosed. Approximately 150 grams of phosphors were placed into the reactor at atmospheric pressure. The reactor was maintained at the temperature (°C.) indicated in Table 1. Aluminum trichloride was used as the metal containing precursor. The aluminum trichloride, in powder form, was maintained at a temperature of 150° C. and vaporized by sublimation. The vaporous aluminum trichloride was introduced into the reactor by flowing a nitrogen carrier gas through the source vessel at the rates indicated (cc/min). A separate stream of ammonia was simultaneously introduced into the reactor as indicated in the table. Air was also introduced into the reactor for some of the runs. The total coating time (hrs) is also indicated in Table 1.

Silver nitrate test: Examples 1 and 2 had poor silver nitrate resistance. Higher deposition temperatures were needed. Samples 3–6 had moderate to good initial silver nitrate resistance(light tan), but darkened after several hours to a few days, possibly due to corrosion of the coatings.

Brightness: Examples 3 and 4 show an increase in brightness corresponding to the use of air in the reaction in addition to simple back diffusion (which gave a 4:1 N/O ratio). Based on the flows for the two measured N/O ratios, the ratio for sample 4 is expected to be about 1:1 or slightly higher.

Examples 7–11
Silicon Oxynitride Coatings

Examples were encapsulated in a manner similar to that used for Examples 1–6, except that the metal-containing precursor was tris dimethylamino silane (TDAS). The TDAS was maintained as a neat liquid at room temperature prior to being vaporized. The processing conditions of subsequent results are reported in Table 2.

TABLE 2

| Example # | Phosphor (grams) | TDAS (sccm) | NH$_3$ (sccm) | air (sccm) | N$_2$ (sccm) | temp (° C.) | time (hrs) | B$_0$ (%) | N/O |
|---|---|---|---|---|---|---|---|---|---|
| 7 | 30 | 11 | 65 | 0 | | 350 | 5.5 | 45% | 1:3 |
| 8 | 30 | 11 | 65 | 10 | | 350 | 5.5 | 51% | 1:3 |
| 9 | 30 | 11 | 65 | 0 | | 500 | 5.5 | 53% | 1:1 |
| 10 | 30 | 11 | 65 | 10 | | 500 | 5.5 | 73% | 2:3* |
| 11 | 150 | 400 | 500 | 500 | 500 | 500 | 5.0 | 80% | |

*there was higher oxygen content near the surface for this sample

Silver Nitrate Test: All Examples had good to excellent initial and extended silver nitrate tests (light tan coloration for several weeks exposure), including Examples 7 and 8.

Brightness: Examples 7 and 8 tended to have moderate brightness despite higher oxygen content. Examples 9–11 had higher nitrogen contents, and showed an increase in initial brightness up to 80% for increasing oxygen content deposited under these conditions.

Examples 12–14
Plasma-Enhanced CVD

In Examples 12–14, silicon oxynitride coatings were deposited by plasma enhanced CVD. The reaction system comprised of a four-inch diameter quartz tube to which a fitted quartz plate was fused to hold the phosphor particles. The precursors were trimethylsilane, TMS, NH$_3$, and O$_2$. The processing conditions of results are reported in Table 3.

Reactor gases were metered through a mass flow controller for the TMS gas and rotameters for ammonia and oxygen gases. The gases were premixed and introduced at the bottom of the quartz tube. The flow rate of the gases was adjusted to main fluidization of the phosphor particles over the fritted quartz plate. Gases were exhausted at the top of the quartz tube by means of a pumping line attached to a vacuum pumping stack. The stack was made up of a roots blower (200 cfm roots vacuum blower manufactured by Alcatel) backed by a mechanical pump (30 cfm dual-stage mechanical pump manufactured by Alcatel). A particulate trap was installed in between the quartz tube and the pumping stack in order to prevent the phosphor particles from reaching the pumps.

Plasma was generated within the quartz tube by means of a water-cooled copper tube (a two-turn coil) connected in parallel to a variable vacuum capacitor (Jennings 2300 pico-Farad capacitor). The variable capacitor was adjusted so that the two-turn coil and the capacitor formed a resonant circuit at 13 Mhz. This resonant LC circuit was driven by a Class C oscillator (for an explanation of such an oscillator, see for example in "Industrial High Frequency Electric Power," by E. May, p 130, Chapman & Hall, London (1949)). The plate power of the oscillator varied between 0.9 and 2.5 kW. The actual power delivered to the plasma was significantly lower, calculated to be in the 0.4–1.0 kW range.

The precursors were trimethyl silane, TMS, $NH_3$, and $O_2$. The processing conditions and results are reported in Table 3. Samples collected from the walls of the quartz tube were analyzed by auger electron spectroscopy and the results are reported in Table 3.

excellent long term resistance to discoloration. Examples 18–20 were tested for retained brightness following operation in 100% R.H. After 24 hrs, they retained 50%, 22%, and 63%, respectively, versus less than 10% for uncoated phosphor.

Brightness: Examples high in nitrogen had the tan/gold color characteristic of titanium nitride and low brightness. Example 15 was too conductive for testing. Examples coated at 500° C. with higher air flows had somewhat improved initial brightness, and based on appearance, flows, and N/O data for the lower temperature samples likely had lower N/O ratios near about 1:1.

The following prophetic examples, which have not been performed, further demonstrate the invention.

Prophetic Example 1

Phosphor particles are placed in a reactor similar to that utilized in the previous Examples. The reactor containing the phosphor particles is maintained at a temperature within the range of about 400° C. to about 600° C. Separate metal containing precursor gas streams of a silicon tetrachloride and aluminum trichloride are conveyed into the reactor at rates which give a total flux equivalent to those of Examples 1–4. Ammonia and air precursor gas streams are simultaneously added to the reactor as indicated in:Examples 1–4.

The phosphors are encapsulated by a silicon aluminum oxynitride coating. The coating would have a nitrogen to oxygen ratio of about 1. The coating would be sufficiently non-porous in order to prevent the darkening of the particle when exposed to silver nitrate.

TABLE 3

| Example # | Phosphor (grams) | TMS (sccm) | $NH_3$ (sccm) | $O_2$ (sccm) | P (mtorr) | Time (hrs) | $B_0$ (%) | N/O |
|---|---|---|---|---|---|---|---|---|
| 12 | 100 | 5.4 | 239 | 184 | 550 | 24 | 86% | 6:100 |
| 13 | 100 | 11 | 290 | 105 | 390 | 22.5 | 84% | 7:10 |
| 14 | 100 | 16.4 | 211 | 105 | 360 | 18 | | |

Examples 15–20
Titanium Oxynitride Coatings

Samples 15–20 were fabricated similar to Examples 1–11, but tetrakis dimethylamino titanium was used as the metal containing precursor. This precursor was heated to 95° C. for Examples 18–20 to increase the vapor pressure and corresponding flux of the precursor. The processing conditions and subsequent results are reported in Table 4.

Prophetic Example 2

Phosphor particles are placed in a reactor similar to that utilized in the previous Examples. The reactor containing the phosphor particles is maintained at a temperature within the range of about 300° C. to about 500° C. Precursor gas streams of a tris dimethylamino aluminum and tris dimethylamino silane at flow rates which provide an equivalent flux per gram of phosphor as in Examples 7–11, are introduced

TABLE 4

| Example # | Phosphor (grams) | TDAT (sccm) | $NH_3$ (sccm) | air (sccm) | temp (° C.) | time (hrs) | $B_0$ (%) | N/O |
|---|---|---|---|---|---|---|---|---|
| 15 | 15 | 500 | 50 | 0 | 300 | 7 | Shorted | 3.5:1 |
| 16 | 15 | 500 | 50 | 0 | 400 | 5 | <10% | 2.0:1 |
| 17 | 15 | 500 | 50 | 16 | 400 | 5.5 | 22% | 1.5:1 |
| 18 | 150 | 600 | 420 | 100 | 500 | 3 | 21% | |
| 19 | 150 | 600 | 420 | 250 | 500 | 3 | 32% | |
| 20 | 150 | 500 | 1000 | 1000 | 500 | 4 | 33% | |

Silver nitrate resistance: Examples 15–17, deposited at 300° C.–400° C., had poor to moderate resistance to discoloration. Examples 18–20, deposited at 500° C., had good to into the reactor. Oxygen is also added to the reactor at a flow rate equivalent to Example 12.

The phosphors are encapsulated by a silicon aluminum oxynitride coating. The coating would have a nitrogen to oxygen ratio of about 1. The coating would be sufficiently non-porous in order to prevent the darkening of the particle when exposed to silver nitrate.

Prophetic Example 3

Phosphor particles are placed in a reactor similar to that utilized in the previous Examples. The reactor containing the phosphor particles is maintained at a temperature within the range of about 300° C. to about 600° C. A single precursor gas stream containing silicon, alkyl amino ligands, and oxygen ligands is directed into the reactor at a flow rate sufficient to give a flux equal to those reported in Examples 7–11.

The resulting reaction encapsulates the phosphor particles with a silicon oxynitride coating. The coating would have a nitrogen to oxygen ratio of about 1. The coating would be sufficiently non-porous in order to prevent the darkening of the particle when exposed to silver nitrate.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A plurality of encapsulated particles comprising:
   electroluminescent phosphor particles of a material which exhibits humidity-accelerated decay; and
   a substantially transparent metal oxynitride coating which sufficiently encapsulates the electroluminescent phosphor particles to provide the electroluminescent phosphor particles with reduced sensitivity to humidity-accelerated decay.

2. The encapsulated particles as set forth in claim 1, wherein said metal oxynitride coating has a nitrogen to oxygen molar ratio in the range of about 4:1 to about 1:4.

3. The encapsulated particles as set forth in claim 1, wherein the metal in said metal oxynitride is selected from the group consisting of aluminum, boron, silicon, titanium, zirconium and combinations thereof.

4. The encapsulated particles as set forth in claim 1, wherein said coating is sufficiently non-porous to provide a phosphor particle with a substantial resistance to darkening when said encapsulated particle is exposed to silver nitrate.

5. The encapsulated particles as set forth in claim 1, wherein said metal oxynitride coating has a thickness in the range of about 0.03 microns to about 1.0 microns.

6. The encapsulated particles as set forth in claim 1, wherein each of said encapsulated particles includes a metal oxynitride coating having a plurality of metal oxynitride layers.

7. The encapsulated particles as set forth in claim 1, further comprising at least one metal oxide coating applied onto said metal oxynitride coating.

8. The encapsulated particles as set forth in claim 7, wherein said metal oxynitride coating and said metal oxide coating have a combined total thickness in the range of about 0.03 microns to about 1.0 microns.

9. The encapsulated particles as set forth in claim 1, wherein each of said encapsulated particles has an initial electroluminescent brightness which is equal to or greater than about 50 percent of the initial electroluminescent brightness of said phosphor particle without the coating.

10. The encapsulated particles as set forth in claim 1, wherein each of said encapsulated phosphor particles comprises a phosphor particle made with at least one phosphor compound selected from the group consisting of a zinc sulfide-based phosphor, a calcium sulfide-based phosphor, a zinc selenide-based phosphor, a strontium sulfide-based phosphor and a combination thereof.

11. An electroluminescent device including the encapsulated electroluminescent phosphor particles of claim 1.

12. The encapsulated particles of claim 1, comprising a zinc sulfide-based phosphor, a calcium sulfide-based phosphor, a zinc selenide-based phosphor or a strontium sulfide-based phosphor.

13. The encapsulated particles as set forth in claim 1, wherein the phosphor particles comprise zinc sulfide having a crystal structure, and include one or more of copper sulfide, zinc selenide or cadmium sulfide in solid solution within the crystal structure or as second phases or domains within the particle structure.

14. A plurality of encapsulated particles comprising:
   electroluminescent phosphor particles of a material which exhibits humidity-accelerated decay; and
   a substantially transparent coating including nitrogen, oxygen, and at least one metal which sufficiently encapsulates the electroluminescent phosphor particles to provide the electroluminescent phosphor particles with reduced sensitivity to humidity-accelerated decay.

15. The encapsulated particles as set forth in claim 14, wherein the phosphor particles comprise zinc sulfide having a crystal structure, and include one or more of copper sulfide, zinc selenide or cadmium sulfide in solid solution within the crystal structure or as second phases or domains within the particle structure.

16. A method for manufacturing an electroluminescent device, comprising:
   providing a substrate;
   applying a transparent electrode layer to the substrate;
   applying a phosphor layer to the transparent electrode layer, the phosphor layer comprising a mixture of an organic material and a plurality of electroluminescent phosphor particles of a material which exhibits humidity-accelerated decay, the particles having a substantially transparent coating including nitrogen, oxygen, and at least one metal that encapsulates tile particles sufficiently so that the device has reduced humidity-accelerated decay;
   applying a dielectric layer to the phosphor layer; and
   applying an electrode to the dielectric layer.

17. A method according to claim 16, wherein the coating has a nitrogen to oxygen molar ratio in the range of about 4:1 to about 1:4.

18. A method according to claim 16, wherein the metal comprises aluminum, boron, silicon, titanium, zirconium or a combination thereof.

19. A method according to claim 16, wherein the coating is sufficiently non-porous to provide the phosphor particles with a substantial resistance to darkening when exposed to silver nitrate.

20. A method according to claim 16, wherein the coating has a thickness in the range of about 0.03 microns to about 1.0 microns.

21. A method according to claim 16, wherein the coating comprises a plurality of metal oxynitride layers.

22. A method according to claim 16, further comprising at least one metal oxide coating applied onto the transparent coating.

23. A method according to claim 22, wherein the metal oxide coating and the transparent coating have a combined total thickness in the range of about 0.03 microns to about 1.0 microns.

24. A method according to claim 16, wherein the phosphor particles have an initial electroluminescent brightness which is equal to or greater than about 50 percent of the initial electroluminescent brightness of the phosphor particles without the coating.

25. A method according to claim 16, wherein the phosphor particles have an initial electroluminescent brightness which is equal to or greater than about 80 percent of the initial electroluminescent brightness of the phosphor particles without the coating.

26. A method according to claim 16, wherein the coating has been applied to the phosphor particles at temperatures that do not cause undesirable changes or shifts in the color of the light emitted by the phosphor particles.

27. A method according to claim 16, wherein the phosphor particles comprise zinc sulfide-based phosphor, calcium sulfide-based phosphor, zinc selenide-based phosphor, strontium sulfide-based phosphor or a combination thereof.

28. A method according to claim 16, wherein the phosphor particles comprise a zinc sulfide phosphor.

29. A method according to claim 16, wherein the phosphor particles comprise zinc sulfide having a crystal structure, and include one or more of copper sulfide, zinc selenide or cadmium sulfide in solid solution within the crystal structure or as second phases or domains within the particle structure.

30. A method for operating an electroluminescent device, comprising:

applying an electric field across two electrodes separated by a dielectric layer and a phosphor layer, the phosphor layer comprising a mixture of an organic material and a plurality of electroluminescent phosphor particles of a material which exhibits humidity-accelerated decay, the particles having a substantially transparent coating including nitrogen, oxygen, and at least one metal that encapsulates the particles sufficiently so that the device has reduced humidity-accelerated decay;

whereby proximate portions of the phosphor layer emit light as the phosphor particles therein are excited and the device has reduced humidity-accelerated decay during operation.

31. A method according to claim 30, wherein the phosphor particles comprise zinc sulfide-based phosphor, calcium sulfide-based phosphor, zinc selenide-based phosphor, strontium selenide-based phosphor or a combination thereof.

32. A method according to claim 30, wherein the phosphor particles comprise zinc sulfide having a crystal structure, and include one or more of copper sulfide, zinc selenide or cadmium sulfide in solid solution within the crystal structure or as second phases or domains within the particle structure.

* * * * *

UNITED STATES PATENT AND TRADEMARK OFFICE
CERTIFICATE OF CORRECTION

PATENT NO. : 6,458,512 B1
DATED : October 1, 2002
INVENTOR(S) : Budd, Kenton D.

It is certified that error appears in the above-identified patent and that said Letters Patent is hereby corrected as shown below:

Column 1,
Line 45, delete "." after "material".

Column 2,
Line 45, delete ";" after "high".

Column 10,
Line 37, "TABLE 2" should be on a line by itself just after "reported in Table 2".

Column 12,
Line 26, delete ":" after "in".

Column 14,
Line 49, "tile" should read -- the --.

Signed and Sealed this

Nineteenth Day of August, 2003

JAMES E. ROGAN
*Director of the United States Patent and Trademark Office*